US006663717B2

(12) United States Patent
Antila et al.

(10) Patent No.: US 6,663,717 B2
(45) Date of Patent: Dec. 16, 2003

(54) PROCESS FOR THE FRACTIONATION OF SUGAR BEET PULP (75) Inventors: Tapio Juhani Antila, Espoo (FI); Timo Väkeväinen, Kirkkonummi (FI); Christina Lindqvist, Kantvik (FI); Hannu Koivikko, Kantvik (FI); Matti Tylli, Kantvik (FI); Juho Jumppanen, Surrey (GB); Pertti Walliander, Kantvik (FI); Nina Mäyrä, Helsinki (FI)

(73) Assignee: Danisco Sugar Oy, Espoo (FI)

( * ) Notice: Subject to any disclaimer, the term of this patent is extended or adjusted under 35 U.S.C. 154(b) by 62 days.

(21) Appl. No.: 10/091,892

(22) Filed: Mar. 6, 2002

(65) Prior Publication Data
US 2002/0189606 A1 Dec. 19, 2002

Related U.S. Application Data (63) Continuation of application No. PCT/FI00/00780, filed on Sep. 15, 2000.

(30) Foreign Application Priority Data
Sep. 17, 1999 (FI) .................................................. 991985

(51) Int. Cl.[7] ............................................. C08B 37/06
(52) U.S. Cl. ........................... 127/34; 127/46.2; 536/2; 536/128; 435/101
(58) Field of Search ................. 127/34, 46.2; 536/2, 536/128; 435/101

(56) References Cited

U.S. PATENT DOCUMENTS

| 4,816,078 A | * | 3/1989 | Schiweck et al. |
| 5,008,254 A | | 4/1991 | Weibel |
| 5,250,306 A | | 10/1993 | McCleary et al. |
| 5,472,952 A | | 12/1995 | Carsten et al. |
| 5,952,308 A | | 9/1999 | Yoshio et al. |
| 6,447,614 B1 | * | 9/2002 | Kuusisto et al. ............. 127/29 |

FOREIGN PATENT DOCUMENTS

| DE | 43 13 549 C1 | 10/1994 |
| EP | 0 868 854 | 10/1998 |
| JP | 56 011 903 | 2/1981 |
| SE | 453 511 | 2/1988 |
| WO | WO 99/10542 | 3/1999 |
| WO | WO 99/19365 | 4/1999 |

OTHER PUBLICATIONS

Chemical Abstract., vol. 52, (1958), No month provided, ref. viite 18230g.
Chemical Abstract., vol. 55 (1961), No month provided, ref. 22994i.
Chemical Abstract., vol. 67 (1967), No month provided, ref. 12777e.
Cheng L. et al., "Effect of Cations on the Elution of Pectic Polysaccharides from Anion–Exchange Resins", *Analytical Biochemistry* 228:109–114 (1995) No month provided.

* cited by examiner

Primary Examiner—David Brunsman
(74) Attorney, Agent, or Firm—Scully, Scott, Murphy & Presser (57) ABSTRACT The invention relates to a method of simultaneous purification and separation of pectin and pectic sugars/oligomers from sugar beet pulp using a multi-step process in an aqueous solution. The method comprises hydrolysis of the sugar beet pulp, solids separation from the sugar beet pulp hydrolysate as well as fractionation and desalting of the aqueous solution of the sugar beet pulp hydrolysate thus obtained into a desalted solution enriched in pectin and a desalted solution enriched in pectic sugars/oligomers. The process may also comprise optional further steps, such as clarification, adsorption, concentration and further chromatographic treatment.

25 Claims, 3 Drawing Sheets

PROCESS FOR THE FRACTIONATION OF SUGAR BEET PULP

This application is a Continuation of International Application PCT/FI00/00780 filed Sep. 15, 2000 which designated the U.S. and was published under PCT Article 21(2) in English.

BACKGROUND OF THE INVENTION

The invention relates to purification and fractionation of pectin-containing vegetable material, especially sugar beet pulp. The invention relates particularly to separating pectin and pectic sugars/oligomers and simultaneously salts from pectin-containing sugar beet pulp by using separation methods based on the molecular weight, such as ultrafiltration and chromatographic fractionation.

Pectin is a commonly used additive in food industry. It is useful, for example, as a stabilizing agent, thickener and gelling agent in, for example, jams and other fruit-based products as well as in sour milk-based products, such as yoghurts.

For the separation of pectin, the vegetable material used as a starting material, such as sugar beet pulp, is first brought into a soluble form by using, for example, acidic or basic hydrolysis. During the hydrolysis, salts are introduced into the solution which are usually undesired in the final pectin product and which should thus be removed.

Pectins have conventionally been produced from apples, sugar beet pulp or the citrus peel by first extracting soluble polymers with acid, whereafter the obtained solution is filtered and concentrated and the pectins are precipitated with alcohol or metal salts at a suitable pH. Free sugars remain in the alcohol-water solution. Since the amounts of solvent utilized in the method are large, the sugar content in the alcohol-water solution is extremely low.

In addition to pectins, the sugar beet pulp includes valuable sugar components, such as L-arabinose. In accordance with the methods known hitherto, the simultaneous separation of pectin and sugar components has been difficult, e.g. for the reason that when separating sugars, pectin has a tendency to be destroyed. On the other hand, in the earlier methods for separating pectin, the sugar/oligomer components are not normally recovered.

A previous method to produce pectin from a sugar beet pulp hydrolysate is disclosed in SE-B 453511 (Nils Monten). This method uses anion exchange to purify the sugar beet hydrolysate. The method results in an impure pectin solution, not purified pectin.

JP Patent 56 011 903 (Chisso Corporation) describes the use of ultrafiltration for separating "crude" pectin from vegetable material. The starting material is first treated with hydrochloric acid at a pH 2.5 to 3.0, and pectin is extracted at a temperature of 85° C. The obtained product is purified by filtration, and the filtrate is ultrafiltered by using a membrane having a cut-off size of 6000 to 20000 Da.

U.S. Pat. No. 5,008,254 (Weibel, M. K.) discloses a method wherein fast acidic hydrolysis is conducted at a high temperature (120° C.) for a short period of time (six seconds) in order to recover a pectin-sugar mixture from sugar beet pulp. The hydrolyzed mixture containing sugars and some pectin compounds is concentrated by ultrafiltration (cut-off size 30000 Da). Said fast acidic hydrolysis is extremely complex technically, and the insoluble fibres which remain when the acidic hydrolysis is used tend to disintegrate into colloidal mass which is difficult to filter.

It is thus known to concentrate sugar beet hydrolysates by ultrafiltration, but these methods do not provide purified pectins.

DE Patent Specification 4 313 549 (Herbstreich & Fox KG Pektin FA) describes a method of preparing a pectin-containing extract from sugar beet material. In the method, the raw material is hydrolyzed with a citric acid solution at a temperature varying between 50° C. and the boiling temperature of the solution.

U.S. Pat. No. 4,816,078 (Süddeutsche Zucker-Aktiengesellschaft) describes the recovery of L-arabinose from sugar beet pulp or other vegetable material by basic hydrolysis, the L-arabinose being subsequently chromatographically purified. U.S. Pat. No. 5,250,306 (British Sugar PLC) discloses the recovery of araban from sugar beet pulp by first using basic hydrolysis and then ultrafiltration. In the basic hydrolysis according to this publication, pectin is destroyed and only sugars can be recovered.

WO 99/10542 (Cultor Corporation) describes the recovery of L-arabinose from sugar beet pulp using chromatographic separation with a cation exchanger in a monovalent form. This process includes, as a preceding step, extraction of sugar beet pulp with a strong alkaline solution. The use of strong alkali destroys pectin compounds, whereby only sugars are recovered.

The utilization of enzymes to degrade high molecular citrus pectins is known in the art. European Publication 868854 (Japan Tobacco Inc.) discloses a method of hydrolyzing citrus pectins so that the molecular weight is reduced to a range of about 20000 to 80000 Da. U.S. Pat. No. 5,472,952 (Squibb Bristol Myers Co.) describes a method to degrade citrus pectins to a molecular weight in a range of 3300 to 500000 in order to obtain a soluble fibre product. U.S. Pat. No. 5,952,308 (Pola Chem. Ind. Inc.) discloses a method of treating apple and citrus pectin with pectinase enzymes. The enzyme treatments are applied to separated high molecular weight pectins. The enzyme treatments are not carried out as a part of the separation/purification process in order to improve the process and the end product starting from sugar beet pulp.

The present invention provides a multistep purification/separation process for producing a high class sugar beet pectin suitable for drying and/or chemical or enzymatic modification simultaneously with high class sugar components such as L-arabinose. The whole purification/separation process takes place in an aqueous solution and the end products are pure aqueous solutions of pectin and pectic sugars/oligomers.

DEFINITIONS RELATED TO THE INVENTION

In connection with the present invention, pectins refer to polysaccharide compounds of high molecular weight being composed of partly methylated polygalacturonic acid chains (polygalacturonic acid content at least 65%). Pectin also contains araban, galactan and xylose side chains attached to the polygalacturonic acid chain, and rhamnoses interrupting the continuous polygalacturonic acid chain. Furthermore, the galacturonic acid groups of sugar beet pectin are partly acetylated.

In connection with the present invention, pectic sugars/oligomers refer to polysaccharides, oligosaccharides and mono- and disaccharides, such as arabans of low molecular weight, arabino-oligomers, arabinose, galactans, galactose, galacto-oligomers, rhamnose and fucose, which are present together with pectin in the sugar beet pulp after the sugar extraction. The sugar beet pulp to be treated may also contain small amounts of sucrose, glucose and fructose.

In connection with the present invention, sugar beet pulp refers to pulp which is obtained in connection with the production of sugar and which remains after sugar extraction and from which the sugars have to a large extent been extracted.

In connection with the present invention, the sugar beet pulp hydrolysate refers to hydrolyzed sugar beet pulp which contains pectins and pectic sugars/oligomers as well as salts to be separated and which is in the form of a solution.

In connection with the present invention, salts refer to small-molecular ionized substances, typically to inorganic small-molecular ionized substances such as sodium salts, potassium salts and calcium salts. Typically, the salts are the sodium, potassium and/or calcium salts of inorganic acids, such as hydrochloric acid, sulphuric acid and/or nitric acid. These are typically in salt form in a neutralized solution and in ion form in an acidic solution. The salts mainly originate from the pretreatment, such as acidic or basic hydrolysis and potential neutralization of sugar beet pulp.

BRIEF DESCRIPTION OF THE INVENTION

The method of the invention has been successfully used for separating/purifying pectins and pectic sugars/oligomers into separate products while salts have simultaneously been removed from the pectins and pectic sugars/oligomers. The method in its entirety is conducted in an aqueous solution. This enables inflammability and toxicity problems relating to the use of organic solvents, such as isopropanol and ethanol, to be avoided.

Since the whole process is carried out in water solution, the pectin compounds are present in a soluble form throughout the procedure. This means a great advantage compared to earlier methods where the pectin is first separated by alcohol or metal precipitation and later redissolved in order to carry out necessary modifications.

The separation method used in the present invention is based on molecular weight fractionation, i.e. the fractionation is effected on the basis of different molecular weights of the components to be separated.

The pectin and pectic sugar/oligomer products recovered from the method of the invention can be used in foods and feeds as such. The products can also be dried e.g. by spray drying or modified by enzymatic or chemical methods to obtain other products. It is possible to modify the end product by adjusting the separation/purification process in order to produce taylor-made pectins with desired molecular weight. The produced pectins are of high purity providing clear, colour-free water solutions. The produced pectin products can be used as food ingredients, thickeners, emulsifiers, soluble fiber products and texturizers. The recovered pectic sugar products, such as L-arabinose products are useful as special sweeteners, for example.

Objects of the invention are achieved by a method which is characterized by what is set forth in the independent claims. Preferred embodiments of the invention are disclosed in the dependent claims.

DETAILED DESCRIPTION OF THE INVENTION

In the following description of the invention, pectin contents, salt contents and concentrations of pectic sugars/oligomers are set forth as calculated from the dry solids content of the pectin-containing solutions and of the pectic sugar/oligomer-containing solutions, respectively.

The invention relates to a method of simultaneous purification and separation of pectin and pectic sugars/oligomers from sugar beet pulp using a multis-step process in an aqueous solution. The method comprises the following steps:

(a) hydrolysis of the sugar beet pulp to obtain a sugar beet pulp hydrolysate, (b) solids separation from the sugar beet pulp hydrolysate to obtain an aqueous solution of the sugar beet pulp hydrolysate, (c) fractionation and desalting of the aqueous solution of the sugar beet pulp hydrolysate using a separation process based on molecular weight to obtain a desalted solution enriched in pectin and a desalted solution enriched in pectic sugars/oligomers, (d) recovering the desalted solution enriched in pectin, and (e) recovering the desalted solution enriched in pectic sugars/oligomers.

In step (a) of the claimed method, the water-soluble pectin material is extracted from sugar beet pulp by hydrolysis. The hydrolysis step (a) is preferably carried out with an acid. The hydrolysis may also be carried out with a base in mild conditions at relatively low temperatures, such as 0 to 30° C., typically at a pH of 10–13. In strong alkaline conditions and at elevated temperatures pectin is easily destroyed. The hydrolysis may also be carried out with an enzyme, typically using an enzyme preparation having pectinase activity (including arabinase and galactanase activity). The hydrolysis may also be carried out with an enzyme preparation having protease activity. Furthermore, the hydrolysis may be effected by heating the solution.

The hydrolysis of step (a) for sugar beet pulp is typically carried out with acid to give an acidic sugar beet pulp hydrolysate. The hydrolysis is typically conducted at a temperature less than 100° C., e.g. at 75° C. at a normal pressure with, for example, hydrochloric acid, sulphuric acid or nitric acid, typically at a pH of about 1.5 to 2.5. The hydrolysis time may be 2 to 10 hours, for example.

Step (a) gives a hydrolysate containing pectin, pectic sugars/oligomers and salts.

In addition to solubilizing the pectin and pectic sugars/oligomers, the purpose of the hydrolysis step is to improve the yield and to adjust the molecular weight of the pectin to the desired range.

After the hydrolysis, solid substances are separated from the sugar beet pulp hydrolysate thus obtained, to obtain an aqueous solution of the sugar beet pulp hydrolysate. The solids separation of step (b) is typically carried out by centrifugation and filtration. Also screw-pressing can be used.

The method of the invention may also comprise an enzyme treatment step, typically before or after the hydrolysis step. The enzyme treatment step is typically carried out with an enzyme preparation having pectinase activity and which is active in acidic conditions. The enzyme treatment may also be carried out with an enzyme preparation having protease activity.

The dry solids content of the pectin-containing solution subjected to the following fractionation step is typically 1 to 20%, preferably 2 to 10%, most preferably 1.5 to 5%. The pH of the solution is typically less than 5, preferably less than 4, most preferably between 1.5 and 3.

The aqueous solution of the sugar beet pulp hydrolysate obtained after the solids separation is then fractionated using a separation process based on molecular weight to obtain a fraction enriched in pectin and a fraction enriched in pectic sugars/oligomers. The fractionation methods are typically selected from ultrafiltration and chromatographic separation.

In the ultrafiltration, a fraction enriched in pectin (the high molecular weight component) is obtained as the retentate and a fraction enriched in pectic sugars/oligomers (the low molecular weight components) is obtained as the permeate. By ultrafiltration it is thus possible to separate the small molecular weight components from pectin. Ultrafiltration can also be used to concentrate the solution. Ultrafiltration is typically followed by diafiltration. The ultrafiltration is typically carried out using an ultrafiltration membrane retaining molecules having a molecular weight over about 10000 Da.

Ultrafiltration/diafiltration also removes the salts, whereby desalting is effected at the same time with the fractionation.

Alternatively, the fractionation of step (c) may be carried out by chromatographic separation. The chromatography allows the recovery of several fractions, usually 2 or 3 fractions, where the components are concentrated.

In the chromatographic fractionation of step (c), the aqueous solution of the sugar beet pulp hydrolysate is introduced into a chromatographic column and separated into a fraction enriched in pectin and a fraction enriched in pectic sugars/oligomers, using water as the eluant. The fraction enriched in pectin (the high molecular weight fraction) is obtained as the first fraction and the fraction enriched in pectic sugars/oligomers (the low molecular weight fraction) is obtained as the second fraction. Furthermore, a fraction enriched in salts is typically obtained between the pectin fraction and the sugar fraction, or after the sugar fraction.

Said fraction enriched in pectin may comprise one or more pectin-containing fractions, depending on the desired narrowness of the molecular weight distribution for the pectin product.

The chromatographic fractionation of step (c) is typically carried out at a temperature of 40 to 90° C., preferably 50 to 80° C., and most preferably 65 to 80° C.

The chromatographic fractionation uses water as the eluant.

The chromatographic fractionation is carried out by using a separation resin based on size exclusion. The size exclusion separates pectins of high molecular weight from sugars of lower molecular weight and salts. The sugars of lower molecular weight are adsorbed in the resin and are separated from pectin. Typically, the first fraction to be obtained from the chromatographic column is the pectin fraction, and the sugars of low molecular weight and salts are obtained as the second fraction.

With the resin in $Ca^{2+}$ form, the ions are eluted between the compounds of high molecular weight and the compounds of low molecular weight (between pectin and sugars). With the resin in $Al^{3+}$ form, the ions are eluted partly in the same fraction as the monosaccharides or after them, which gives a very pure pectin fraction.

The chromatographic separation is typically carried out with a cation exchange resin. The cation exchange resin may be, for example, a cross-linked styrene-divinylbenzene copolymer resin (DVB copolymer resin) which can be in the form of a multivalent metal cation, such as in $Ca^{2+}$, $Mg^{2+}$, Pb2+ or $Al^{3+}$ form.

When as pure pectin as possible is desired, the resin is preferably in the form of a multivalent metal, such as in aluminium ($Al^{3+}$) form.

The degree of cross-linking of the cation exchange resin is typically 3 to 12% DVB, preferably 4 to 8% DVB, and the particle size 0.1 to 2 mm, preferably 0.2 to 0.4 mm.

The pectin fraction and the fraction/fractions containing pectic sugars/oligomers are recovered from the chromatographic treatment. The pectin fraction is typically obtained first and the sugar fraction/fractions subsequently. If desired, these main fractions can be further purified.

Desalting is as a rule effected in connection with the fractionation method, i.e. ultrafiltration and chramatography also remove the salts. If desired, further desalting can be carried out using ion-exchange. The ion-exchange treatment for removing the salts is carried out with a combination of a strong cation exchanger and a weak anion exchanger.

The method of the invention may also comprise a clarification step, which is typically carried out after the solids separation of step (b) or after the fractionation of step (c). The clarification may be effected, for example, by enzyme treatment. Clarification of the separated pectin solution is best carried out with a combination of enzymes having protease activity. The clarification may also be effected by an additional acid hydrolysis or by filtration. The solution can be further clarified using "precoat" filtration with a suitable additional filtration agent.

The method of the invention may also comprise an adsorption step. The adsorption is typically carried out after the separation step (c). Activated carbon or adsorbent resin is typically used as the adsorbent. The adsorbent treatment removes colour and potential off-flavours and bitter substances.

The method of the invention may also comprise a concentration step. The concentration is typically carried out after the fractionation of step (c) or after the optional adsorption step followed by the fractionation step (c). The concentration is typically carried out by ultrafiltration and/or evaporation.

Furthermore, the fraction enriched in pectic sugars/oligomers obtained in the fractionation of step (c) may be subjected to a further chromatographic separation to obtain a fraction enriched in L-arabinose and optionally other fractions enriched in other pectic sugars/oligomers. The chromatographic separation is typically carried out with a cation exchange resin. The cation is preferably selected from a monovalent ion, such as $H^+$ and $Na^+$. When a resin in the form of a monovalent ion ($H^+$, $Na^+$) is used, the monosaccharide fraction is free from ions to give a very pure monosaccharide fraction (pectic sugar/oligomer fraction).

The molecular weight of the sugar beet pectin obtained by the method of the invention varies between 10000 and 60000 Da. By the method of the invention, it is possible to obtain a clarity above 90% (measured from a 1% pectin solution as transmittance at a wave length of 655 nm). The product is also easily soluble.

The pectin in the form of a solution thus obtained can be modified chemically. The pectin can be cross-linked, for example. The cross-linking, which is preferably covalent cross-linking, can be carried out by using, for example, an oxidase such as laccase.

The acidic pectin solution can also be neutralized partly or completely with metal salts or hydroxides (e.g. NaOH). The pectin (pH 3 to 4.5) partly neutralized as metal salts represents the stablest form of pectin, so the neutralization treatment also improves the stability of pectin.

The purified pectin solution thus obtained can be dried to a commercial product. The drying is typically carried out as spray drying or roll drying. If necessary, the dried pectin can be powdered, agglomerated to a granular form and sieved into a suitable particle size. The final pectin product is packed and stored in a dry place. The pectin can also be concentrated with a sugar solution into a stable sugar-pectin solution which can as such be used as a stabilizing agent in juices.

The desired pectic sugars/oligomers of low molecular weight, such as arabans, arabino-oligosaccharides and arabinose, are recovered from the pectic sugar/oligomer fraction/fractions of the chromatographic separation. The sugars are obtained in the form of a sugar solution, which can be crystallized to the desired sugar product, such as an L-arabinose product. The sugar solution can also be concentrated into syrup (dry solids content 50 to 60%, for example) or which can be further purified and fractionated as described above or by using other methods.

The best process sequence is selected on the basis of the raw material quality and on the basis of the intended products. Due to a high variation in the raw material characteristics, which is typical for a natural plant material like sugar beet pulp, the flexibility of the totally water based process means a great advantage compared to earlier methods where the pectin is first precipitated by alcohol and later redissolved to carry out modifications. In the earlier methods the oligomer/sugar components are normally not recovered, whereas in the method of the invention these components are recovered simultaneously.

In the method of the invention, it is possible to modify the end product by adjusting the separation/purification process in order to produce taylor made pectins with comparatively low molecular weight. The adjustment of the molecular weight of the end product can be effected e.g. at the hydrolysis stage by varying the acid/enzyme dosages, pH, temperature and time of the hydrolysis, or after the solids separation using post-hydrolysis with varying acid/enzyme dosages, varying pH and temperature conditions and using varying post-hydrolysis times.

Figure 1:
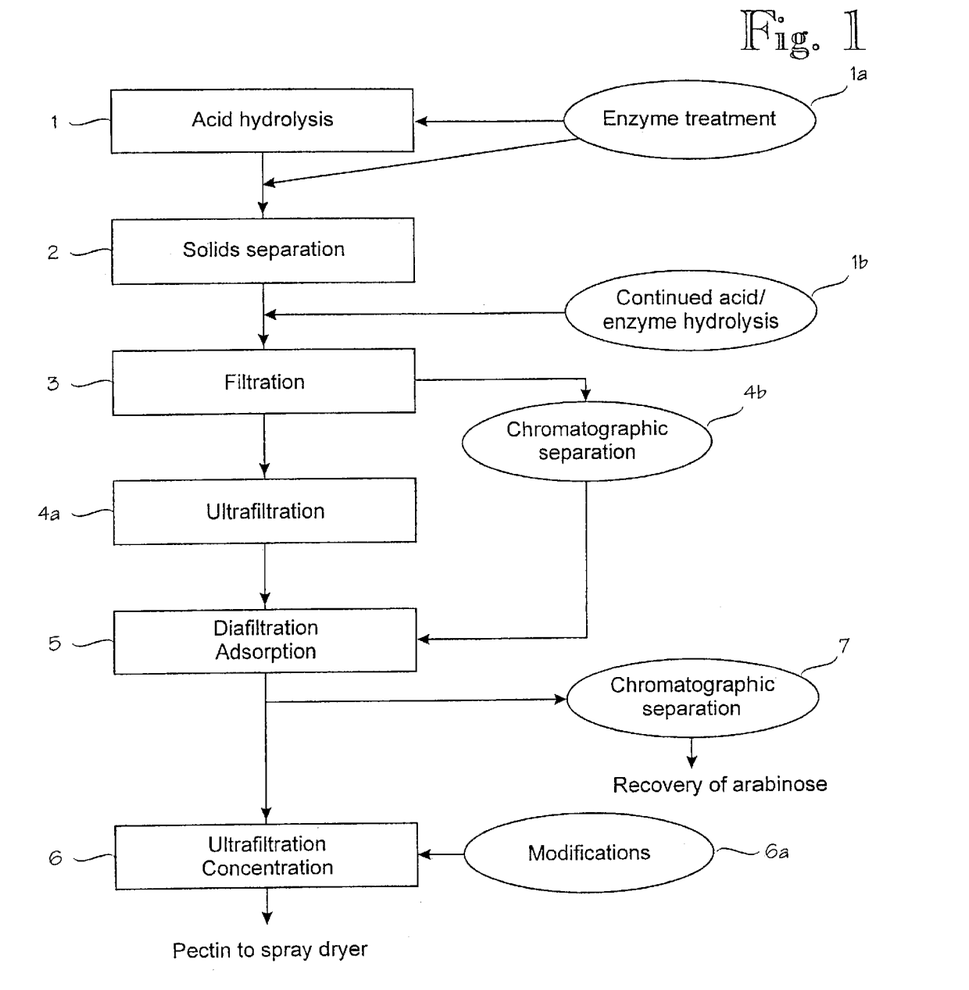
FIG. 1 shows one embodiment of the method of the invention with basic alternatives.

One embodiment of the method of the invention with basic alternatives is set forth in FIG. 1. The figure shows an acid hydrolysis step 1 with optional enzyme treatment 1a, solids separation 2 followed by optional continued hydrolysis 1b with an acid or enzymes, filtration 3 followed by ultrafiltration 4a or chromatographic separation 4b, optional diafiltration/adsorption 5 after ultrafiltration/chromatography, ultrafiltration concentration 6 of the pectin fraction with optional modifications 6a of the pectin product followed by spray drying of the pectin product, as well as a further chromatographic separation 7 of the sugar/oligomer fraction followed by recovery of L-arabinose.

The sugar-beet-based raw material used as the starting material is preferably biologically preserved sugar beet pulp. This is typically obtained by lowering the pH of the pulp to a value of 3.5 to 4.5 and by subsequently storing the pulp in substantially oxygen-free conditions. The preparation of biologically preserved sugar beet pulp is disclosed in WO 99/10384.

The biologically preserved sugar beet pulp is typically obtained by treating fresh, pressed-out sugar beet pulp from which the sugars have been extracted and which has a dry solids content of about 20 to 30 wt-% such that the pH is lowered to about 4, preferably by mixing a suitable acidic solution into the pulp. Organic acids, such as formic acid, lactic acid, acetic acid and/or mixtures thereof are efficient and easy to use. There are also commercial acid mixtures available, such as "Ensimax", which consists of formic acid and lignosulphonate, and silage acid (AIV acid), which mainly consists of formic acid. The treatment is preferably carried out immediately after the pressing, when the pulp has a temperature of about 60° C. The acid-treated pulp, which has a pH of about 4, is preferably packed in an airtight manner, e.g. in a plastic bag or a plastic tube, and left to stabilize.

The method of the invention can also utilize dried sugar beet pulp as the raw material, the dried sugar beet pulp being brought into the form of a solution by using hydrolysis in the above-described manner.

In the following, the invention will be described by using detailed but non-restrictive examples.

The analytic methods used in the examples were as follows:

galacturonic acid: a spectrophotometric method (Blumenkrantz, N & Asboe-Hansen, G., New method for quantitative determination of uronic acids, Anal. Biochem., 54(1973) 484 to 489) or HPLC;

mono- and oligosacchadides: HPLC, $Pb^{++}$;

the dry solids content and weight percentages of the solutions: measurement of the refractive index of the solutions (Index Instruments Automatic Refractometer GRP 11-37) or oven drying at 105° C.;

conductivity: standard conducting meter (Radiometer CDM92);

pH: Radiometer PHM92;

the molecular weights (estimated molecular weights) of the recovered pectin polymers were determined on the basis of viscosity using sodium hexametaphosphate as reference.

EXAMPLE A

Preparation of biologically preserved sugar beet pulp for use as the starting material for Examples 1, 2, 4 and 5.

Fresh, pressed-out, sugarfree sugar beet pulp (1000 kg) having the dry solids content of about 22% was treated with 4 liters of commercial acid mixture "Ensimax" (manufactured by Kemira Oy, Finland). The acid mixture contained 30% by weight of formic acid (85-%), 20% by weight of acetic acid (80-%), and 50% by weight of lignosulphonate (37-%). While being mixed, the temperature of the sugar beet pulp was 50 to 60° C., and the mixing was conducted for about one minute, in a screw mixer. The mixture was packed in a tight plastic bag which was manufactured from a 0.25 mm polyethene film. The pulp was left to cool and stabilize outdoors, and the bags were stored outdoors for four months.

Example 1

5400 kg of the biologically preserved sugar-free sugar beet pulp prepared in accordance with Example A (including 25% dry substance) was added to 23000 liters of water in a 30 cubic meter reactor. 36 kg of concentrated sulphuric acid was added and mixed with the pulp to a pH of 1.5. the mixture thus obtained was heated to 75° C. and the pulp was hydrolyzed for 2.5 hours. The pH was adjusted to 3.5 with 40 kg of 50% NaOH, whereafter the mixture was filtered. The undissolved solids were removed from the filtrate by spinning in a decanting centrifuge. The recovered solution was clarified using a disc-stack bowl centrifugal machine and polish-filtered with a pre-coat filter (Seitz filter with diatomaceous earth as filter aid). The dry substance content of the filtrate was 3.0% by weight.

The filtrate was subjected to ultrafiltration using a membrane with a cut-off size of 10000 Da (flow rate of 18 liters/sqm/h, total ultrafiltration time of ca 10 hours) to remove the low molecular weight compounds, including sugars and salts. The high molecular weight pectin was recovered in the retentate as a pectin fraction, while the low molecular weight components were recovered in the permeate as a sugar fraction.

The recovered pectin fraction was further purified by diafiltration and adsoption resin (Optipore). The purified pectin solution was then concentrated using ultrafiltration (with a membrane having a cut-off size of 10000 Da) and finally by evaporation to a concentration of 3% by weight, which is suitable for spray drying. The volume of the total recovered solution was 6 cubic meters.

Analysis of the evaporated pectin solution:

| | |
|---|---|
| Dry substance (RI) | 3% |
| Estimated molecular weight | 58000 |
| Clarity (based on transmittance) | 25 |
| pH | 3.5 |
| No off-colour or flavour | |

The pectin fraction was dried by spray drying to obtain a comparatively high molecular weight sugar beet pectin suitable as a texturizer and thickener for foods.

Analysis of the permeate (the sugar fraction) obtained from the fractionation step (the first ultrafiltration) is set forth in the following table. The monomeric sugars (arabinose, glucose and fructose) and the oligomers were determined by HPLC with or without analytic hydrolysis.

Analysis of the permeate:

| | |
|---|---|
| Dry substance | 1.2% |
| Monomeric sugars | 30% of the dry substance |
| Oligomers | 30% of the dry substance |
| Salts (mainly $Na_2SO_4$) | 30% of the dry substance |
| pH | 3.5 |

The sugar fraction was purified by chromatography to remove the salts and to recover sugar and oligomer fractions, especially L-arabinose. The chromatographic separation was carried out with a cation exchange resin in $Na^+$ form (a sulphonated polystyrene-divinylbenzene copolymer resin having a cross-linking degree of 5.5%, resin particle size of about 0.45 mm, manufacturer Finex Oy, Finland). The height of the resin bed was 6.4 m and the temperature of the feed solution about 70° C. The composition of the feed solution was about 30% monomeric sugars, about 30% oligomers and about 60% salts, based on the dry substance. The feed was concentrated to 15% dry substance. The chromatographic separation resulted in a sugar fraction containing about 85% L-arabinose to be recovered by crystallization.

Example 2

A sugar beet pulp hydrolysate prepared by mild acid hydrolysis was purified by solids removal and filtration as in Example 1. The filtered solution was subjected to chromatographic separation where the small molecular weight sugars were separated from the salts and from the high molecular weight pectins, using (A) a resin in $Ca^{2+}$ form or (B) a resin in $Al^{3+}$ form.

(A) Chromatographic Separation with a Resin in $Ca^{2+}$ form

The filtered solution was subjected to chromatographic separation in a column containing a sulphonated polystyrene-divinylbenzene copolymer resin having a cross-linking degree of 4% (Korela VO6C resin, manufacturer Finex Oy, Finland). The chromatographic separation was carried out in the following conditions: resin in $Ca^{++}$ form, average diameter of resin particles 0.25 mm, height of the resin bed 1.7 m, diameter of the column 9.5 cm and temperature 65° C., bed volume 11.9 $dm^3$, flow rate 40 ml/min, feed volume 1000 ml, conductivity of the feed solution 12 mS/cm, dry solids content of the feed solution 3.0%, pH of the feed solution 3.5, water as the eluant.

Figure 2:
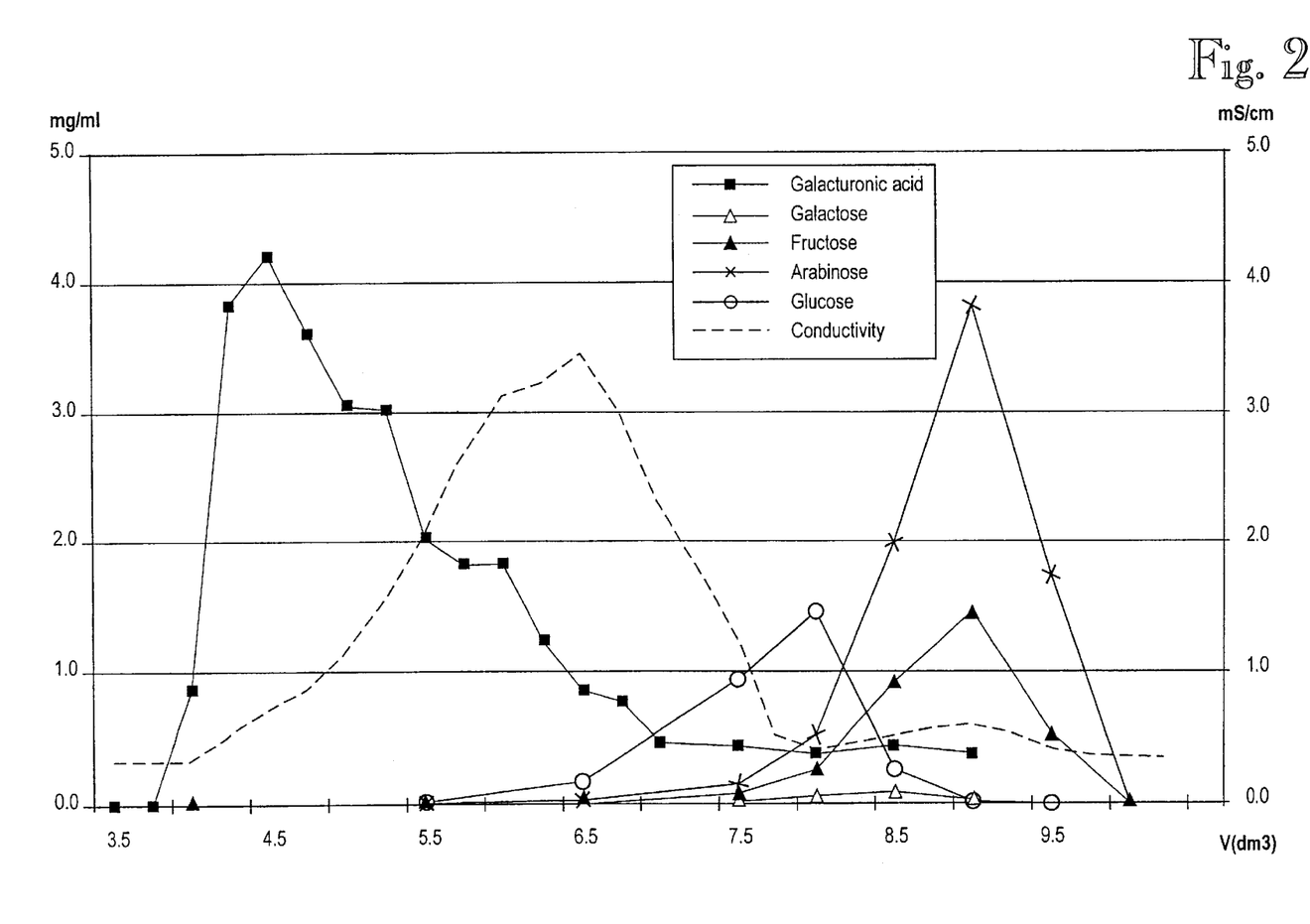
FIG. 2 shows the results of the chromatographic separation of the product of Example 1 using a resin in $Ca^{2+}$ form.

The results are shown in FIG. 2. The fraction which was eluted first (volumes 3.5 to 5.5) contained most of the pectin, the next fraction (volumes 5.5 to 7.5) contained the salts, and the third fraction (volumes 8 to 10) contained the sugars. The separation gave three fractions: a pectin fraction, a salt fraction and a sugar fraction.

The pectin fraction was treated by an adsorption resin to remove the remaining colours and concentrated by ultrafiltration/diafiltration (using an ultrafiltration membrane having a cut-off size of 10000 Da) and by evaporation to a dry substance concentration of 3.5%.

Analysis of the concentrated pectin solution:

| | |
|---|---|
| Dry substance (RI) | 3.5% |
| Estimated molecular weight | 50000 |
| pH | 3.5 |
| No off-colour or flavour | |

The pectin fraction was dried by spray drying to provide a comparatively high molecular weight product. The product is suitable as texturizer and emulsifier in foods.

The sugar solution was concentrated into a syrup having a dry solids content of 50 to 60%. The obtained syrup as such can be used as an aroma precursor, or, for example, it can be further fractionated.

(B) Chromatographic Separation with a Resin in $Al^{3+}$ form

The filtered hydrolysate was subjected to chromatographic fractionation using the same resin as in fractionation (A) above, except that the resin was in $Al^{3+}$ form. The chromatographic fractionation was carried out in a column which was 1 m in height and 4.5 cm in diameter (volume of the resin was 1 liter). The bed volume was 0.75 liters and the feed volume 80 ml.

The resin was subjected to back-washing and regenerated to hydrogen form with three bed volumes of 5-wt-% hydrochloric acid and washed with ion-exchanged water. The regeneration to aluminium form was carried out by first introducing three bed volumes of 10-wt-% aluminium sulphate solution through the resin bed (1 bed volume/hour) and, subsequently, at the same flow rate, 1.5 bed volumes of 10-wt-% aluminium sulphate solution having the pH adjusted to a value of 1.5. The resin was washed with ion-exchanged water (8 to 10 bed volumes).

Figure 3:
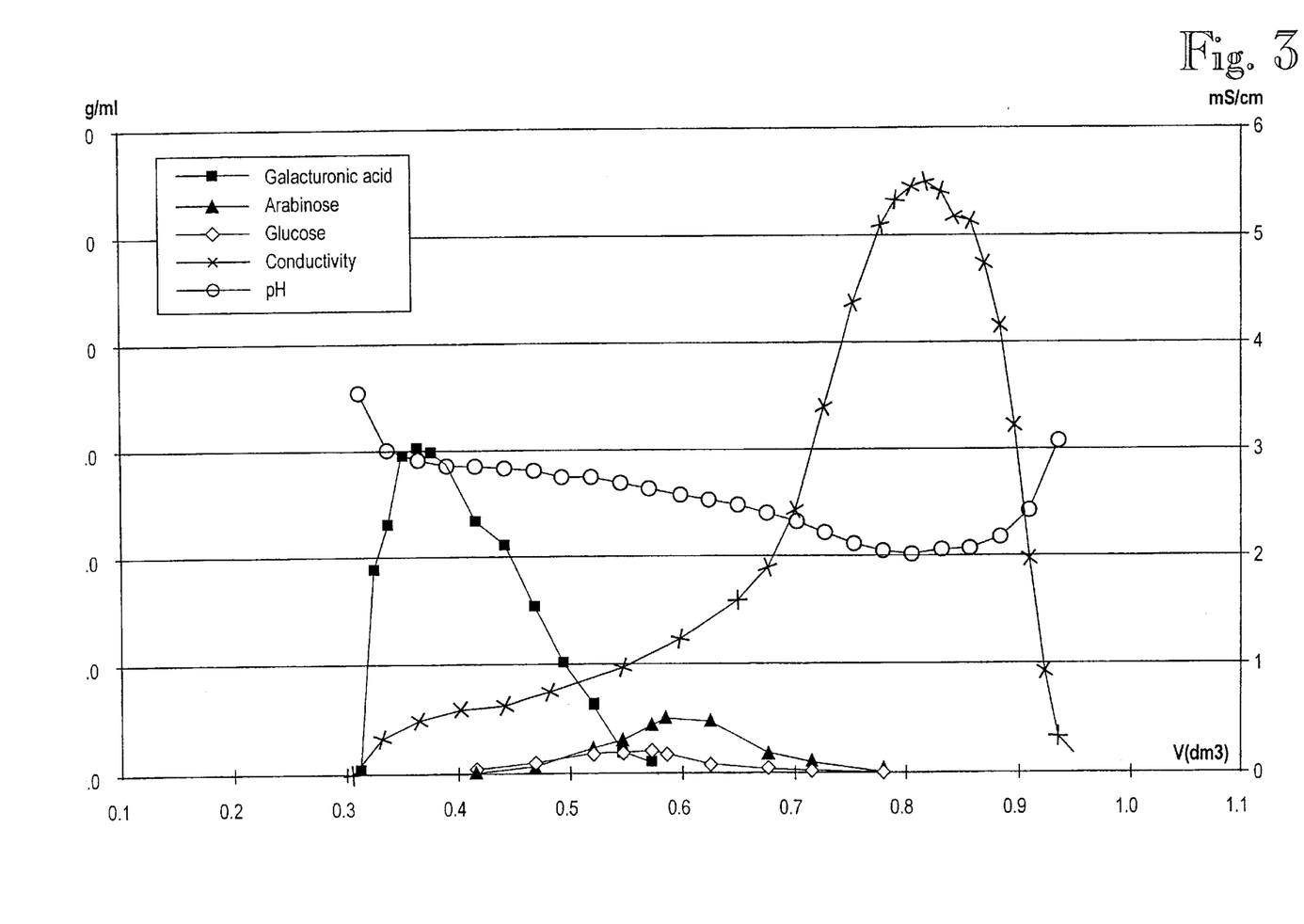
FIG. 3 shows the results of the chromatographic separation of the product of Example 1 using a resin in $Al^{3+}$ form.

The temperature of the chromatographic separation was 70° C. and the flow rate of the separation was 13 ml/min. The pectin hydrolysate having a dry solids content of 1.6% was heated to the separation temperature before introducing it into the column. The collection of the fractions was started 15 minutes after the pectin hydrolysate had been introduced into the column, and the samples were taken at intervals of one minute. The result of the separation is shown in FIG. 3.

The figure shows that the pectin material of high molecular weight is eluted in a retention volume of 0.3 to 0.5 l. The conductivity curve indicates that most of the ions in the solution introduced into the column are eluted between 0.5 and 0.8 l. The retention volume of monosaccharides is between about 0.4 to 0.7 l. The separation of the pectin material and the ions was similar to the separation conducted with the resin in $Ca^{2+}$ form above, but the pectin and ions were separated better.

The pectin fraction thus obtained was treated by an adsorption resin in the same way as above to remove the remaining colours and concentrated by ultrafiltration/diafiltration (using an ultrafiltration membrane of a cut-off size of 10000 Da) and by evaporation to a dry substance content of 3.5%. The analysis of the concentrated pectin solution was essentially the same as in fractionation (A) above.

The pectin fraction was dried by spray drying to provide a comparatively high molecular weight product. The product is suitable as texturizer and emulsifier in foods.

The sugar fraction was treated in the same way as in process (A) above.

Example 3

Dried sugar beet pulp containing 4 kg of dry substance was hydrolyzed in 70 liters of water containing 600 g sulphuric acid (96%) for two hours at 75° C. The pH was adjusted to 1.5 with NaOH and the non-dissolved biomass was removed in a basket centrifuge. The hydrolysate was cooled to 50° C. and subjected to enzyme treatment with a pectinase enzyme preparation (Viscozyme 120 L, manufacturer Novo Nordisk) in an amount of 2.5 µl/1 g pectin for 10 minutes to complete the hydrolysis. The enzyme was inactivated by heating to 70° C. The obtained hydrolysate containing 3% dry subtance was filtered in a Seitz filter.

The solution obtained from the filtration was subjected to ultrafiltration using a membrane with a cut-off size of 5000 Da (Millipore Helicon UF50). The flow rate was 12 liters/sqm/h. The recovered pectin concentrate was purified by diafiltration and adsorption as in Examples 1 and 2 and concentrated by ultrafiltration/diafiltration (cut-off size of 10000 Da) and by evaporation to 3% dry substance.

Analysis of the concentrated pectin solution:

| | |
|---|---|
| Dry substance | 3% |
| Estimated molecular weight | 30000 |
| pH | 3.5 |
| No off-colour or flavour | |

Spray drying of the pectin fraction provided a product with a medium molecular weight suitable e.g. as a emulsifier and as a soluble fiber component in foods.

Example 4

7.6 kg of biologically preserved sugar-free pulp with a dry substance content of 21% (including 1.6 kg dry substance) was subjected to acid hydrolysis with sulphuric acid at a pH of 1.5 and at a temperature of 75° C. for 2.5 hours. The solution was neutralized with a NaOH solution to a pH of 3.5 and cooled to 50° C. The solution was subjected to a protease-containing enzyme (Sumizyme AP, manufacturer Shin-Nippon Kagaku K.K) in an amount of 0.4 mg of dry enzyme /1 g pectin for 0.5 hours at 50° C., whereafter the enzymes were inactivated by heating to 70° C. The solution was filtered with a pre-coat-filter.

The filtered solution was subjected to ultrafiltration/diafiltration and purification in the same way as in Example 3.

The pectin thus obtained had a medium molecular weight (40000 Da), providing a colour-free solution with a clarity of 96%. The product is suitable e.g. as a soluble fiber component in foods.

Example 5

Biologically preserved sugar beet pulp prepared in accordance with Example A was subjected to acid hydrolysis in the same way as in Example 4. The solution was subjected to a pectinase enzyme (Viscozyme 120 L, manufacturer Novo Nordisk) in an amount of 2.5 µg/1 g pectin for 10 minutes at 50° C., whereafter the enzyme was inactivated by heating to 70° C. Then the biomass was removed by decanting centrifugation and the obtained hydrolysate was subjected to a second acid hydrolysis at pH 1.5 for 3 hours and 20 minutes at 70° C. After filtration, a clear pectin solution was obtained. The small molecular weight components were further separated from this solution by ultrafiltration in the same way as in Example 3.

The ultrafiltered pectin product had a comparatively low molecular weight (22000 Da) and provided a clear, colour-free water solution. The product is suitable e.g. as a soluble fiber component and texturiser in foods.

The permeate from the ultrafiltration was subjected to chromatographic separation to recover L-arabinose. The resin used in the chromatographic separation was a cation exchange resin in $Na^+$ form (a sulphonated polystyrene divinyl benzene copolymer resin having a cross-linking degree of 5.5% and a resin particle size about 0.45 mm, manufacturer Finex Oy, Finland). The height of the resin bed was 6.4 m and the temperature of the feed solution about 70° C. The composition of the feed solution was about 30% monomeric sugars, 30% oligomeric sugars and about 60% salts, based on the dry substance. The feed was concentrated to 15% dry substance. The chromatographic separation resulted in a sugar fraction containing about 85% L-arabinose to be recovered by crystallization.

It is obvious to one skilled in the art that as technology advances, the basic idea of the invention can be implemented in many different ways. The invention and its embodiments are thus not restricted to the examples described above but they can vary within the scope of the claims.

What is claimed is:

1. A method of simultaneous purification and separation of pectin and pectic sugars/oligomers from sugar beet pulp using a multi-step process in an aqueous solution, comprising the steps of
   (a) hydrolysis of the sugar beet pulp to obtain a sugar beet pulp hydrolysate,
   (b) solids separation from the sugar beet pulp hydrolysate to obtain an aqueous solution of the sugar beet pulp hydrolysate,
   (c) fractionation and desalting of the aqueous solution of the sugar beet pulp hydrolysate using a separation process based on molecular weight to obtain a desalted solution enriched in pectin and a desalted solution enriched in pectic sugars/oligomers,
   (d) recovering the desalted solution enriched in pectin, and (e) recovering the desalted solution enriched in pectic sugars/oligomers.

2. A method as claimed in claim 1, wherein the hydrolysis of step (a) is carried out with an acid.

3. A method as claimed in claim 1, wherein the process further comprises an enzyme treatment step.

4. A method as claimed in claim 3, wherein the enzyme treatment is carried out before or after the hydrolysis step.

5. A method as claimed in claim 3, wherein the enzyme treatment step is carried out with an enzyme having pectinase activity.

6. A method as claimed in claim 3, wherein the enzyme treatment step is carried out with an enzyme having protease activity.

7. A method as claimed in claim 1, wherein the solids separation of step (b) is carried out by centrifugation and filtration.

8. A method as claimed in claim 1, wherein the fractionation of step (c) is carried out using ultrafiltration optionally followed by diafiltration to obtain a fraction enriched in pectin as the retentate and a fraction enriched in pectic sugars/oligomers as the permeate.

9. A method as claimed in claim 8, wherein the ultrafiltration is carried out using an ultrafiltration membrane retaining molecules having a molecular weight over about 10000 Da.

10. A method as claimed in claim 1, wherein the fractionation of step (c) is carried out using chromatographic separation to obtain a first fraction enriched in pectin and a second fraction enriched in pectic sugars/oligomers.

11. A method as claimed in claim 10, wherein a further fraction enriched in salts is obtained.

12. A method as claimed in claim 10, wherein the chromatographic separation is carried out with a cation exchange resin.

13. A method as claimed in claim 12, characterized in that the cation exchange resin is in the form of a multivalent metal.

14. A method as claimed in claim 13, wherein the metal is selected from $Ca^{2+}$ and $Al^{3+}$.

15. A method as claimed in claim 1, wherein the process further comprises a clarification step.

16. A method as claimed in claim 15, wherein the clarification is carried out after the solids separation of step (b) or after the fractionation of step (c).

17. A method as claimed in claim 1, wherein the process further comprises an adsorption step.

18. A method as claimed in claim 17, wherein the adsorption step is carried out after the fractionation of step (c).

19. A method as claimed in claim 1, wherein the process further comprises a concentration step.

20. A method as claimed in claim 19, wherein the concentration is carried out after the fractionation of step (c) or after the optional adsorption followed by the fractionation of step (c).

21. A process as claimed in claim 19, wherein the concentration step is carried out by ultrafiltration and/or evaporation.

22. A process as claimed in claim 1, wherein the fraction enriched in pectic sugars/oligomers obtained in the fractionation of step (c) is subjected to a further chromatographic separation to obtain a fraction enriched in L-arabinose and optionally other fractions enriched in other pectic sugars/oligomers.

23. A process as claimed in claim 22, wherein the chromatographic separation is carried out with a cation exchange resin.

24. A process as claimed in claim 23, wherein the cation exchange resin is in the form of a monovalent metal.

25. A process as claimed in claim 23 or 24, wherein the cation is selected from $H^+$ and $Na^+$.

* * * * *